United States Patent
Shao et al.

(10) Patent No.: US 10,051,034 B2
(45) Date of Patent: *Aug. 14, 2018

(54) DETECTING CARRIERS FOR MOBILE DEVICES

(71) Applicant: Facebook, Inc., Menlo Park, CA (US)

(72) Inventors: Wenqi Shao, San Francisco, CA (US);
Alex Bain, Menlo Park, CA (US);
Yingyi Liang, Palo Alto, CA (US);
James Sadewhite, Newark, CA (US);
Tsz Kuen Ching, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,770

(22) Filed: Apr. 18, 2017

(65) Prior Publication Data

US 2017/0223087 A1     Aug. 3, 2017

Related U.S. Application Data

(63) Continuation of application No. 15/193,789, filed on Jun. 27, 2016, now Pat. No. 9,679,313, which is a
(Continued)

(51) Int. Cl.
*H04L 12/28* (2006.01)
*H04L 29/08* (2006.01)
(Continued)

(52) U.S. Cl.
CPC ........ *H04L 67/04* (2013.01); *G06F 17/30899* (2013.01); *G06Q 30/0267* (2013.01);
(Continued)

(58) Field of Classification Search
CPC ......... H04L 67/02; H04L 67/04; H04L 67/10; H04L 67/22; H04L 67/30; H04L 67/42;
(Continued)

(56) References Cited

U.S. PATENT DOCUMENTS 7,908,379 B2    3/2011    Droz et al.
8,135,609 B2    3/2012    Britt, Jr. et al.
(Continued)

FOREIGN PATENT DOCUMENTS

JP     2001309441 A     11/2001

OTHER PUBLICATIONS

Israeli Office Action received from the Israeli Patent Office, for Israeli Patent Application No. 250922, dated Jun. 28, 2017.
(Continued)

*Primary Examiner* — Kevin Mew
(74) *Attorney, Agent, or Firm* — Baker Botts L.L.P.

(57) ABSTRACT

In one embodiment, a method includes sending a request to a computing server from a mobile-client system for a multimedia object. The mobile-client system receives, from the computing server, a query in response to the request for SIM-card information of the mobile-client system. The mobile-client system executes an application in response to the query to access a SIM card of the mobile-client system and retrieve SIM-card information. The mobile-client system sends the retrieved SIM-card information to the computing server. The mobile-client system receives a multimedia object from the computing server, the multimedia object being customized based on the retrieved SIM-card information.

37 Claims, 5 Drawing Sheets

Related U.S. Application Data continuation of application No. 13/922,144, filed on Jun. 19, 2013, now Pat. No. 9,414,219.

(51) Int. Cl.
| | |
|---|---|
| *H04W 8/02* | (2009.01) |
| *H04W 8/18* | (2009.01) |
| *G06Q 30/02* | (2012.01) |
| *G06Q 50/00* | (2012.01) |
| *G06F 17/30* | (2006.01) |
| *H04W 4/60* | (2018.01) |
| *H04L 29/06* | (2006.01) |
| *H04L 29/12* | (2006.01) |

(52) U.S. Cl.
CPC ............. *G06Q 50/01* (2013.01); *H04L 67/02* (2013.01); *H04L 67/10* (2013.01); *H04L 67/42* (2013.01); *H04W 4/60* (2018.02); *H04W 8/02* (2013.01); *H04W 8/18* (2013.01); *H04L 61/6095* (2013.01); *H04L 67/30* (2013.01); *H04L 69/22* (2013.01)

(58) Field of Classification Search
CPC .... H04L 61/6095; H04W 4/003; H04W 8/02; H04W 8/18; G06F 17/30899; G06Q 30/0267; G06Q 50/01
See application file for complete search history.

(56) References Cited

U.S. PATENT DOCUMENTS

| | | | | |
|---|---|---|---|---|
| 9,525,959 | B1* | 12/2016 | Eddings | H04W 4/001 |
| 2006/0075259 | A1* | 4/2006 | Bajikar | H04L 63/0428 |
| | | | | 713/189 |
| 2008/0009317 | A1* | 1/2008 | Lasser | H04M 1/274516 |
| | | | | 455/558 |
| 2009/0247140 | A1 | 10/2009 | Gupta et al. | |
| 2011/0087757 | A1 | 4/2011 | Paalanen et al. | |
| 2012/0163225 | A1* | 6/2012 | Mishkin | H04L 12/14 |
| | | | | 370/252 |
| 2012/0266219 | A1* | 10/2012 | Coleman | H04L 51/28 |
| | | | | 726/6 |
| 2013/0046879 | A1 | 2/2013 | Garcia et al. | |
| 2013/0060851 | A1 | 3/2013 | Davis et al. | |
| 2013/0102328 | A1* | 4/2013 | Kalofonos | H04W 4/02 |
| | | | | 455/456.2 |
| 2014/0085443 | A1* | 3/2014 | Sathish | H04N 21/23418 |
| | | | | 348/61 |
| 2014/0181193 | A1 | 6/2014 | Narasimhan et al. | |
| 2014/0213233 | A1* | 7/2014 | Parry | H04W 8/245 |
| | | | | 455/418 |
| 2014/0310349 | A1* | 10/2014 | Rainisto | H04W 4/21 |
| | | | | 709/204 |

OTHER PUBLICATIONS

Notice Patent of Preliminary Rejection received from the Korean Patent Office, for Korean Application No. 10-2016-7034324, dated Aug. 17, 2017.
Canadian Office Action received from the Canadian Patent Office, for Canadian Patent Application No. 2,945,289, dated Jul. 19, 2017.
Notice of Acceptance received from the Australian IP Government, for Australian Patent Application No. 2017201769, dated Nov. 28, 2017.
Notice of Allowance received from the Korean IP Office, for Korean Patent Application No. 10-2016-7034324, dated Dec. 16, 2017.
Office Action for application No. 2,945,289 from Canadian Intellectual Property Office, dated Mar. 27, 2018.

* cited by examiner

DETECTING CARRIERS FOR MOBILE DEVICES

PRIORITY

This application is a continuation under 35 U.S.C. § 120 of U.S. patent application Ser. No. 15/193,789, filed 27 Jun. 2016, which is a continuation under 35 U.S.C. § 120 of U.S. patent application Ser. No. 13/922,144, filed 19 Jun. 2013, now U.S. Pat. No. 9,414,219.

TECHNICAL FIELD

This disclosure generally relates to mobile computing systems.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

A mobile computing device—such as a smartphone, tablet computer, or laptop computer—may include functionality for determining its location, direction, or orientation, such as a Global Positioning System (GPS) receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, in response to a request for content from a mobile-client system, a carrier-detection system may be used to determine connection-related information for the mobile-client system, such as the carrier, connection-type, connection-status, latency-period, other suitable connection-related information, or any combination thereof for the mobile-client system. Such connection-related information may be determined using a variety of signals, such as, for example, SIM-card information, user history, autonomous system numbers, IP addresses, device type, other suitable signals, or any combination thereof. The carrier-detection system may be physically or logically co-located with another system (such as, for example, a social-networking system, a 3rd-party application server, a web server, an enterprise server) in whole or in part. For example, the carrier-detection system may receive a request for a webpage from a mobile-client system. The carrier-detection system may then use one or more of the signals described above to determine connection-related information for the mobile-client system. A webpage or other content object that has been customized based on the connection-related information for the mobile-client system may then be sent to the system.

DESCRIPTION OF EXAMPLE EMBODIMENTS

Figure 1:
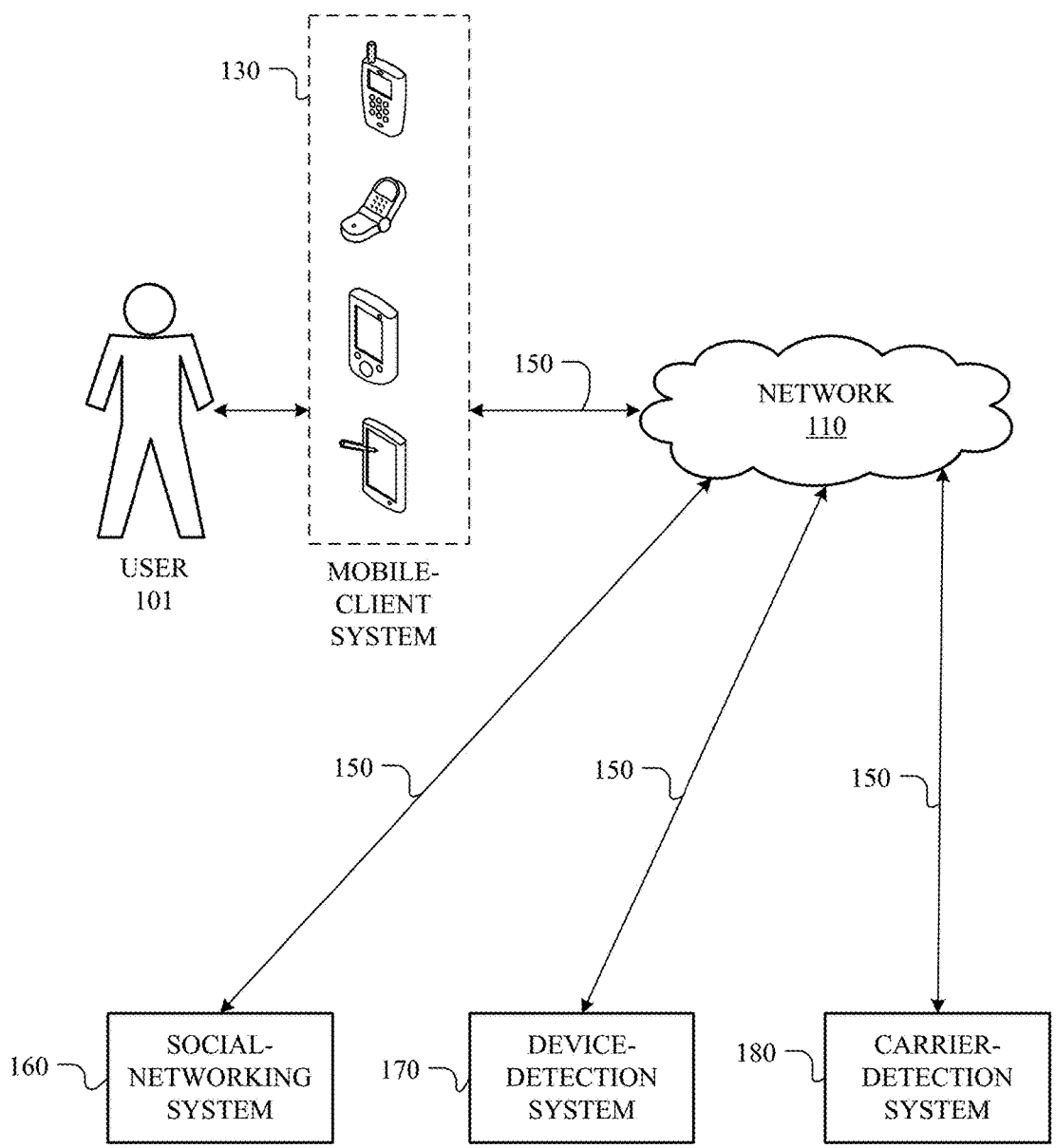
FIG. 1 illustrates an example network environment associated with a social-networking system.

FIG. 1 illustrates an example network environment 100 associated with a social-networking system. Network environment 100 includes a user 101, a mobile-client system 130, a social-networking system 160, a device-detection system 170, and a carrier-detection system 180 connected to each other by a network 110. Although FIG. 1 illustrates a particular arrangement of user 101, mobile-client system 130, social-networking system 160, device-detection system 170, carrier-detection system 180, and network 110, this disclosure contemplates any suitable arrangement of user 101, mobile-client system 130, social-networking system 160, device-detection system 170, carrier-detection system 180, and network 110. As an example and not by way of limitation, two or more of mobile-client system 130, social-networking system 160, device-detection system 170, and carrier-detection system 180 may be connected to each other directly, bypassing network 110. As another example and not by way of limitation, two or more of mobile-client system 130, social-networking system 160, device-detection system 170, and carrier-detection system 180 may be physically or logically co-located with each other in whole or in part. Thus, device-detection system 170 and/or carrier-detection system 180 may be a sub-system of social-networking system 160, or vice versa. As yet another example and not by way of limitation, one or more of mobile-client system 130, social-networking system 160, device-detection system 170, or carrier-detection system 180 may be physically or logically co-located with another system in whole or in part. Thus, device-detection system 170 and/or carrier-detection system 180 may be a sub-system of a 3rd-party application server, a web server, an enterprise server, or another suitable system. Moreover, although FIG. 1 illustrates a particular number of users 101, client systems 130, social-networking systems 160, device-detection systems 170, carrier-detection systems 180, and networks 110, this disclosure contemplates any suitable number of users 101, client systems 130, social-networking systems 160, device-detection systems 170, carrier-detection systems 180, and networks 110. As an example and not by way of limitation, network environment 100 may include multiple users 101, mobile-client system 130, social-networking systems 160, device-detection systems 170, carrier-detection systems 180, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. device-detection systems 170), such as, for example, by setting appropriate privacy settings. In particular embodiments, device-detection system 170 may be a network-addressable computing system that can host an online mobile device detection engine. Device-detection system 170 may generate, store, receive, and send device-related data, such as, for example, device attributes and other suitable device-related data. As an example and not by way of limitation, device-detection system 170 may implement one or more models or algorithms to identify devices and device attributes in response to a request for a network resource received at device-detection system 170 (or received at another systems that can access the device-detection system 170). In particular embodiments, the model or algorithm implemented by device-detection system 170 may use a machine-learned scoring formula, which the scoring algorithm may obtain automatically from a set of training data constructed from pairs of requests for content objects and selected types of mobile-computing devices 130, where appropriate. Device-detection system 170 may be accessed by the other components of network environment 100 either directly or via network 110. In particular embodiments, carrier-detection system 180 may be a network-addressable computing system that can host an online carrier detection engine. Carrier-detection system 180 may generate, store, receive, and send carrier- or device-related data, such as, for example, carrier attributes, device attributes, and other suitable carrier- or device-related data. As an example and not by way of limitation, carrier-detection system 180 may implement one or more models or algorithms to identify carriers, devices, carrier attributes, and device attributes in response to a request for a network resource received at carrier-detection system 180 (or received at another systems that can access the carrier-detection system 180). In particular embodiments, the model or algorithm implemented by carrier-detection system 180 may use a machine-learned scoring formula, which the scoring algorithm may obtain automatically from a set of training data constructed from pairs of requests for content objects and selected types of mobile-computing devices 130, where appropriate. Carrier-detection system 180 may be accessed by the other components of network environment 100 either directly or via network 110. In particular embodiments, one or more users 101 may use one or more client systems 130 to access, send data to, and receive data from social-networking system 160, device-detection system 170, or carrier-detection system 180. Mobile-client system 130 may access social-networking system 160, device-detection system 170, or carrier-detection system 180 directly, via network 110, or via a third-party system. As an example and not by way of limitation, mobile-client system 130 may access device-detection system 170 or carrier-detection system 180 via social-networking system 160. Mobile-client system 130 may be any suitable mobile computing device, such as, for example, a cellular telephone, a smartphone, a personal digital assistant (PDA), or a tablet computer.

In particular embodiments, mobile-client system 130 may include a web browser, such as, for example, MICROSOFT INTERNET EXPLORER (or INTERNET EXPLORER MOBILE), GOOGLE CHROME, GOOGLE ANDROID, APPLE SAFARI, OPERA (or OPERA MINI or OPERA MOBILE), BITSTREAM BOLT, or MOZILLA FIREFOX (or FIREFOX MOBILE), and may have one or more add-ons, plug-ins, or other extensions. To request access to a content object, a user 101 at mobile-client system 130 may enter a Uniform Resource Locator (URL) or other address directing the web browser to a particular server (such as, for example, a server associated with a social-networking system 160, a 3rd-party application server, a web server, an enterprise server, device-detection system 170, carrier-detection system 180, or another suitable system), and the web browser may generate a Hyper Text Transfer Protocol (HTTP) request and communicate the HTTP request to server. The request for the content object may include an http-header comprising one or more header fields that define the operating parameters of the HTTP transaction. The server may accept the HTTP request and communicate to mobile-client system 130 one or more Hyper Text Markup Language (HTML) files responsive to the HTTP request. Mobile-client system 130 may render a content object based on the HTML files from the server for presentation to the user. This disclosure contemplates any suitable content object files. As an example and not by way of limitation, content objects may be webpages rendered from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect mobile-client system 130, social-networking system 160, device-detection system 170, and carrier-detection system 180 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
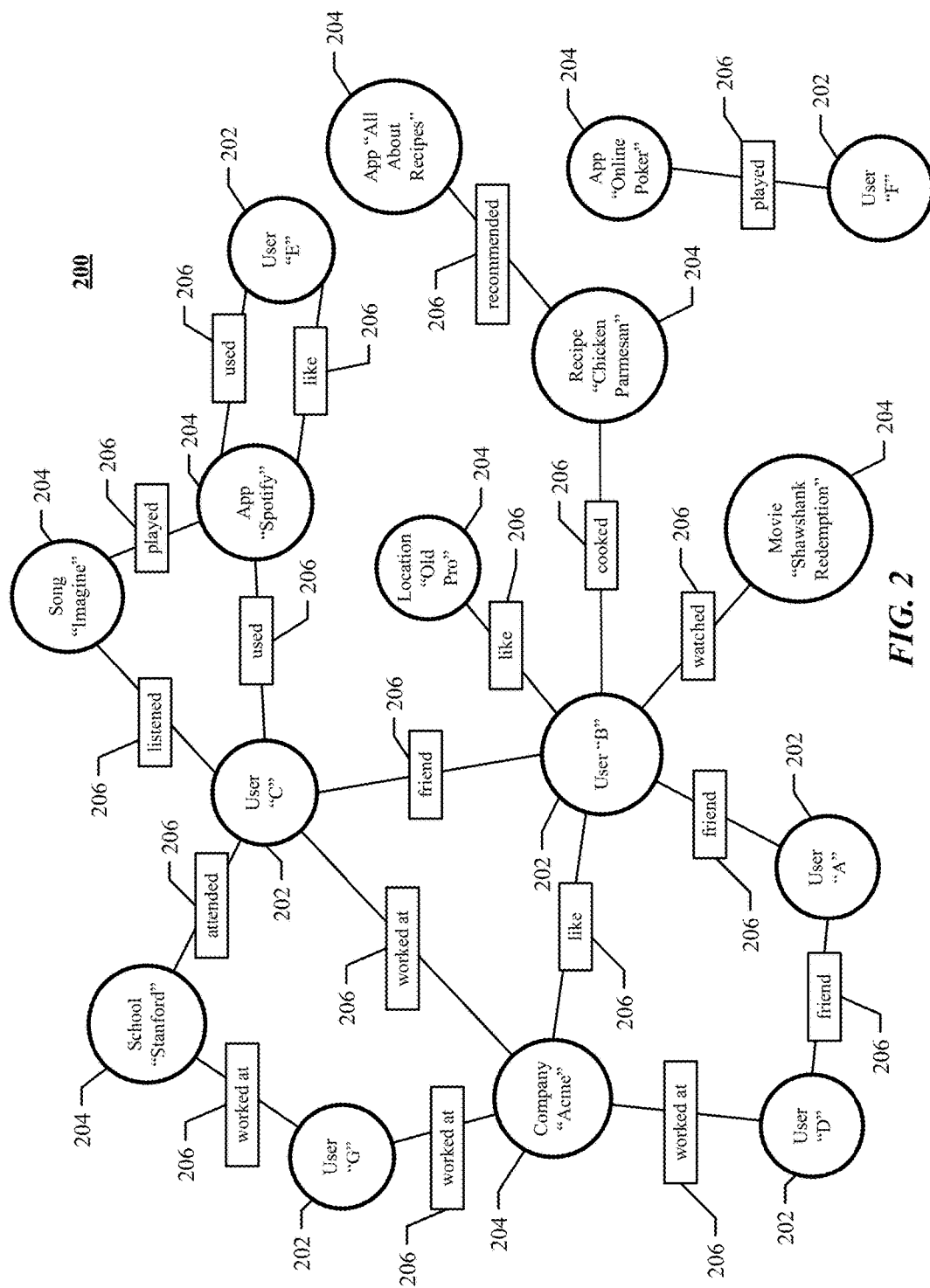
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, mobile-client system 130, device-detection system 170, or carrier-detection system 180 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages (or other suitable network-based content objects).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages (or other suitable network-based content objects).

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a mobile-client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's mobile-client system 130) may indicate that he or she likes the concept represented by the concept node 204 by clicking or selecting a "Like" icon, which may cause the user's mobile-client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile computing devices used to access websites come in a variety of shapes and sizes. A user 101 may use, for example, cell phones, personal digital assistants (PDAs), smartphones, tablets, etc., to access websites over the Internet. However, the physical characteristics and technical capabilities can vary among mobile devices and between mobile devices and traditional computers (e.g., desktop or laptop computers). Thus, some organizations offer mobile versions of their websites that are altered to display properly on a mobile device. For example, an organization with a website hosted at the domain name "example.com," may also have a mobile version of the same website hosted at the domain name, "m.example.com." HTTP requests made to m.example.com may be served with simplified versions of webpages designed to render appropriately on mobile devices. However, the differences between mobile devices make webpages meant to be displayed on one type of mobile device difficult or impossible to view on another mobile device.

Some websites may determine whether a device attempting to access the website is a mobile device, and also determine what type of device it is, by examining a user-agent string sent by the device. When a client makes an HTTP request, the request typically includes an http-header with one or more fields. One of these fields is typically a user-agent string, which may identify, for example, the type of device and/or browser that the client is using. A web-server application may then pass the request on to one or more server-side scripts, which may compare the user-agent string to a list of user-agent strings typically associated with mobile devices to determine if the device is a mobile device. For example, databases such as the Wireless Universal Resource File (WURFL) contain listings of user-agent strings associated with various devices, as well as the capabilities of such devices. The server-side scripts may make use of such databases to determine whether a given HTTP request originates from a mobile device by comparing the user-agent string of the HTTP request with one or more user-agent strings of the database. However, in order to ensure substantial comprehensiveness across the vast number of known devices, such databases tend to be enormous, making the comparison resource-intensive for server-side scripts. Moreover, it is often necessary to continually update such databases to ensure that they account for all mobile devices, as new user-agent strings or mobile devices arise, which means that device information provided by such databases may often be inaccurate. Thus, it may be desirable to use a method of identifying mobile devices and their attributes that does not rely on such databases.

In particular embodiments, in response to a request for a content object from a mobile-client system 130, a device-detection system 170 may be used to determine the attributes of the mobile-client system 130, such as its physical characteristics and technical capabilities, so that the requested content object may be customized for the mobile-client system 130. The device-detection system 170 may be physically or logically co-located with another system (such as, for example, a social-networking system 160, a 3rd-party application server, a web server, an enterprise server, or another suitable system) in whole or in part. As an example and not by way of limitation, the device-detection system 170 may receive a request for a content object from a mobile-client system 130. The device-detection system 170 may access information about the user of the mobile-client system 130, such as, for example, survey information from the user, information received from other applicants on the mobile device, social-networking information related to the user, or other relevant information about the user. The device-detection system 170 may then use information in the http-header received with the request, along with information about the user of the mobile-client system 130, to determine one or more attributes of the mobile-client system 130. The device-detection system 170 may use one or more models or algorithms to predict or otherwise identify the attributes. A content object that has been customized based on the attributes of the mobile-client system 130 may then be sent. Although this disclosure describes determining the attributes of mobile devices in a particular manner, this disclosure contemplates determining that attributes of mobile devices in any suitable manner.

In particular embodiments, the device-detection system 170 may receive a request for a content object from a mobile-client system 130 of a user. The request may be for any suitable type of content object, such as, for example, a webpage, multimedia content, other suitable network-based resources, or any combination thereof. The request may include an http-header. The http-header may include a variety of header field that define the operating parameters of the HTTP transaction. As an example and not by way of limitation, the http-header may include a user-agent string that describes one or more attributes of the browser client on the mobile-client system 130 making the request for the content object. As another example and not by way of limitation, the http-header may include an accept string that describes the types of content that are acceptable. As yet another example and not by way of limitation, the http-header may include an accept-encoding string that describes the types of encodings that are acceptable. Three example http-headers are provided below:

(1) Example http-header from a desktop computer using a FIREFOX browser client:
  User agent: Mozilla/5.0 (Macintosh; Intel Mac OS X 10.8; rv:15.0)
  Gecko/20100101 Firefox/15.0.1
  Accept: text/html,application/xhtml+xml,application/xml;q=0.9,*/*;q=0.8
  Accept encoding: gzip, deflate.
(2) Example http-header from a desktop computer using a CHROME browser client:
  User agent: Mozilla/5.0 (Macintosh; Intel Mac OS X 10_8_2)
  AppleWebKit/537.4 (KHTML, like Gecko) Chrome/22.0.1229.79 Safari/537.4
  Accept: text/html,application/xhtml+xml,application/xml;q=0.9,*/*;q=0.8
  Accept encoding: gzip, deflate, sdch.
(3) Example http-header from a mobile device using a SAFARI browser client:
  User agent: Mozilla/5.0 (iPhone; CPU iPhone OS 6.0 like Mac OS X)
  AppleWebKit/536.26 (KHTML, like Gecko) Version 6.0 Mobile/10A403
  Safari/8536.25
  Accept: text/html,application/xhtml+xml,application/xml;q=0.9,*/*;q=0.8
  Accept encoding: gzip, deflate.

Although this disclosure describes receiving particular requests for content objects in a particular manner, this disclosure contemplates receiving any suitable request for content objects in any suitable manner.

In particular embodiments, the device-detection system 170 may access information describing the user of the mobile-client system 130 (also referred to as the "first user"). The information describing the user may include, for example, information received from the user's mobile device, survey information from the user, social-networking information related to the user, other suitable information about the user, or any combination thereof. Although this disclosure describes accessing particular information about users in a particular manner, this disclosure contemplates accessing any suitable information about users in any suitable manner.

In particular embodiments, the information describing the user may include information received from the mobile-client system 130. In response to the request for a content object from the mobile-client system 130, the device-detection system 170 may access or otherwise receive information form the mobile-client system 130 that describes the mobile-client system 130 or describes its attributes. As an example and not by way of limitation, the device-detection system 170 may determine one or more attributes of the mobile-client system 130 based on a browsing history associated with the user (or the device) requesting a content object. The browsing history of a user may be determined by accessing, for example, tracking cookies, browser logs, cached webpages, tracking pixels, page tags, or other suitable browsing history data associated with the mobile-client system 130. Particular versions of content objects may be formatted/customized for devices with particular attributes. If the browsing history shows that the user has previously accessed such content objects, then the device-detection system 170 may determine that the mobile-client system 130 of the user has one or more attributes associated with those previously accessed content objects. As another example and not by way of limitation, the device-detection system 170 may determine one or more attributes of the mobile-client system 130 based on information accessed from various applications installed on the mobile-client system 130. The mobile-client system 130 may have applications installed on it that can access, for example, the native APIs on the device, application reports, application logs, or other suitable information about the mobile-client system 130. The device-detection system 170 may be able to access the information from these applications in order to access information describing the mobile-client system 130. As yet another example and not by way of limitation, the device-detection system 170 may determine one or more attributes of the mobile-client system 130 based on cookies stored in association with a web browser of the mobile-client system 130. For example, an authentication cookie may be used to identify the user of the mobile-client system 130, or to directly identify the device. Although this disclosure describes receiving particular information from the mobile-client system 130 in a particular manner, this disclosure contemplates receiving any suitable information from the mobile-client system 130 in any suitable manner.

In particular embodiments, the information describing the user may include survey information provided by the user. The survey may be a suitable structured document allowing the user to input or otherwise provide information describing one or more attributes of the mobile-client system 130. As an example and not by way of limitation, the device-detection system 170 may send a survey to the user. For example, the survey may ask the user "Are you using device X?", or more generally, "What type of device are you using?" As another example, the survey may ask about particular attributes of the device. For example, the survey may ask the user "Are you using a device that supports MP4 video files?", or more generally, "What type of media content is supported on your mobile device?" The user may provide the information, for example, by entering the information directly or by selecting the relevant attributes from a list, as appropriate. In particular embodiments, the survey may be sent to the mobile-client system 130. In alternative embodiments, the survey may be sent to another client system associated with the user. As an example and not by way of limitation, the survey may be sent to a desktop or laptop computer of the user, asking for details about the user's mobile device. It may be more convenient for the user to complete the survey on the desktop or laptop computer, for example, because of the ability to use a standard keyboard and mouse to input survey responses. The device-detection system 170 may be able to identify the user on the desktop or laptop when the user accesses a website or other system that can identify the user, such as, for example, a social-networking system 160 or other system that requires authentication. Thus, the device-detection system 170 may be able to identify various devices associated with the user and send surveys to any appropriate system. After the survey is completed, it may be sent to the device-detection system 170, which may receive the survey with the information provided by the user. Although this disclosure describes receiving particular survey information in a particular manner, this disclosure contemplates receiving any suitable survey information in any suitable manner.

In particular embodiments, the information describing the user may include social-networking information related to the user of the mobile-client system 130. The social-networking information related to the user may include, for example, user-profile data related to the user or other users of the online social network, concept-profile data, social-graph information, other suitable data related to the online social network, or any combination thereof. The device-detection system 170 may then determine one or more attributes of the mobile-client system 130 based on social-graph information corresponding to the user of the mobile-client system 130. In particular embodiments, the information describing the user may include information associated with a profile page corresponding to the user. The profile page of the user may include, for example, content, declarations, or other information provided by the user. As an example and not by way of limitation, the user may include the user's address/country of residence, mobile phone number, mobile-service provider information (for example, the user may explicitly list this in his profile, or "like" a concept-profile page associated with his mobile-service provider), employment information, or other suitable information. This information about the user may be useful for identifying particular attributes of the mobile device. As an example and not by way of limitation, the device-detection system 170 may be able to access information identifying the mobile-service provider of the user and then access a list of mobile devices and/or device attributes commonly supported by the mobile-service provider, and then may use this list to predict the attributes of the user's mobile-client system 130. In particular embodiments, the information describing the user may include information associated with one or more other users of the online social network who are related to the user. As an example and not by way of limitation, a first user may be a member of a particular group or association in the online social network (e.g., the users all list being members of the same organization, or working for the same employer on their user-profile pages, or have "liked" the corresponding concept-profile pages), which also includes one or more second users. The device-detection system 170 may already have information describing one or more attributes of the mobile devices of these second user. The device-detection system 170 may then predict that the mobile-client system 130 of the first user has one or more of the same attributes as the devices of the second users. As another example and not by way of limitation, a first user's friends in the online social network (i.e., those represented in the social graph by user nodes 202 within one degree of separation of the first user) may have mobile device with particular attributes. The first user may be more likely to have a device that is the same or similar to the devices used by his friends. Thus, the device-detection system 170 may then predict that the mobile-client system 130 of the first user has one or more of the same attributes as the devices of the first user's friends. Although this disclosure describes receiving particular social-networking information in a particular manner, this disclosure contemplates receiving any suitable social-networking information in any suitable manner.

In particular embodiments, the device-detection system 170 may determine one or more attributes of the mobile-client system 130 based on the http-header received with the request for a content object. In some cases, the http-header may explicitly identify some attributes of the mobile-client system 130. However, in many cases, not all relevant attributes are explicitly identified by the http-header. In these cases, the device-detection system 170 may use the information provided by the http-header, such as the user-agent string, browser-specific strings, or other relevant information, to determine the attributes that are relevant to formatting or customized the requested content object. The device-detection system 170 may use the http-header information to identify or predict the physical characteristics and technical capabilities (collectively "attributes") of the mobile-client system 130. As an example and not by way of limitation, the device-detection system 170 may determine one or more of the following attributes of the mobile-client system 130: programming language support (e.g., JavaScript support), style-sheet language support (e.g., CSS support level), screen size (e.g., the screen diagonal measurement, or the screen pixel resolution), screen pixel density, keyboard type (e.g., physical keyboard, touchscreen keyboard), location-services support (e.g., using one or more of cellular signals, Wi-Fi signals, or GPS to determine the location of the mobile-client system 130), wireless communication support (e.g., Wi-Fi, BLUETOOTH, NFC, IR), image support (e.g., ability to display JPEG, GIF, or PNG images), video support (e.g., ability to display various video types), or other suitable attributes. Determining whether a mobile device has each of these attributes may be useful in order to help customize or properly format the content objects requested by the mobile device. Although this disclosure describes determining attributes of mobile-client systems 130 based on particular http-headers in a particular manner, this disclosure contemplates determining attributes of mobile-client systems 130 based on any suitable http-headers in any suitable manner. Moreover, although this disclosure describes determining particular attributes of mobile-client systems 130, this disclosure contemplates determining any suitable attributes of mobile-client systems.

In particular embodiments, the device-detection system 170 may determine one or more attributes of the mobile-client system 130 based on the accessed information describing the user of the mobile-client system 130. As described previously, information describing the user of a mobile device, such as, for example, information received from the user's mobile device, survey information from the user, social-networking information related to the user, other suitable information about the user, may be useful for determining various attributes about the user's mobile device. The device-detection system 170 may use information about the user of the mobile-client system 130 to identify or predict the physical characteristics and technical capabilities (such as, for example, as described previously) of the mobile-client system 130. As an example and not by way of limitation, the device-detection system 170 may receive information from an application installed on the mobile-client system (e.g., FACEBOOK MOBILE APP) that describes some of the physical or technical features of the mobile device, which may be used to determine the attributes of the mobile device. As another example and not by way of limitation, the device-detection system 170 may receive information survey information from the user that describes the user's mobile device, which may be used to determine the attributes of the mobile device. Although this disclosure describes determining attributes of mobile-client systems 130 based on particular user information in a particular manner, this disclosure contemplates determining attributes of mobile-client systems 130 based on any suitable user information in any suitable manner. Moreover, although this disclosure describes determining particular attributes of mobile-client systems 130, this disclosure contemplates determining any suitable attributes of mobile-client systems.

In particular embodiments, the device-detection system 170 may determine the attributes of a mobile-client system 130 using one or more models or algorithms to identify the attributes. The score may be, for example, a confidence score, a probability, a quality, a ranking, another suitable type of score, or any combination thereof. Thus, in particular embodiments, attributes having higher calculated scores may be more likely to be attributes actually possessed by the mobile-computing system 130. As an example and not by way of limitation, the device-detection system 170 may calculate a probability score for one or more device attributes based on information in the http-header received from the mobile-computing system 130 and information describing the user of the mobile-computing system 130. The following is an example algorithm that device-detection system 170 could use to calculate a probability score for a particular attribute of a mobile-client system 130:

$$s_1 = f(H_1, \ldots, U_1 \ldots, U_n)$$

where:

$s_1$ is the probability score for a first attribute, $H_1, \ldots, H_m$ are http-header fields 1 through m, and $U_1, \ldots, U_n$ are user-profile fields 1 through n.

Particular variable may be more useful for determining particular attributes. Although this disclosure describes calculating a score using particular variables, this disclosure contemplates calculating a score using any suitable variables. In particular embodiments, the model or algorithm implemented by the device-detection system 170 may use a machine-learned scoring formula. The scoring algorithm may obtain the scoring formula automatically from a set of training data constructed from data sets including information about, for example, requests for content objects (e.g., webpages) from mobile devices, various users of mobile devices, and various types of mobile devices. In particular embodiments, the device-detection system 170 may determine the attributes of a mobile-client system 130 by calculating a score for one or more attributes and then identifying each attribute having a score greater than a threshold score. In this way, the device-detection system 170 may be able to ensure a relatively high degree of accuracy for correctly identifying attributes of mobile devices. As an example and not by way of limitation, only attributes with a calculated probability score greater than 0.9 may be identified as being attributes of a mobile-client system 130. Although this disclosure describes determining particular attributes of mobile-client systems 130 in a particular manner, this disclosure contemplates determining any suitable attributes of mobile-client systems 130 in any suitable manner.

In particular embodiments, the device-detection system 170 may send a content object to the mobile-client system 130 in response to the request for the content object from the mobile-client system 130. The content object may be customized based on the determined attributes of the mobile-client system 130. As an example and not by way of limitation, if the mobile-client system 130 is a smartphone with a relatively small screen size (e.g., in the 2.6-inch to 4.5-inch range), then the webpage may be formatted so that the content can be displayed appropriately in the smaller screen. Some content may be rearranged to fit the smaller screen, while other content may be reformatted or even excluded. However, if the mobile-client system 130 is a tablet device with a relatively large screen size (e.g., 7.0-inch to 10.1-inch range), then the webpage may use the same formatting for the content as is used on traditional computing devices (i.e., the formatting used for desktops or laptops). The requested content object may be customized in a variety of ways. As an example and not by way of limitation, a server-side script may specifically format the content object for the mobile-client system 130. As another example and not by way of limitation, a server-side script may forward the request to another server-side script associated with the mobile version of the content object. The sent content object may then be displayed to the user on the mobile-client system 130. In particular embodiments, the device-detection system 170 may also send advertisements or other sponsored content to the mobile-client system 130 in response to the request for the content object. The advertisements may be included in as part of the content object, or separately. The advertisements may correspond to one or more of the objects referenced in the content of the sent content object. Although this disclosure describes sending particular content objects in a particular manner, this disclosure contemplates sending any suitable content objects in any suitable manner.

In connection with device detection, particular embodiments may utilize one or more systems, components, elements, functions, methods, operations, or steps disclosed in U.S. patent application Ser. No. 13/721,900, filed 20 Dec. 2012, which is incorporated herein by reference.

In particular embodiments, carrier-detection system 180 may determine connection-related information for a mobile-client system 130. Mobile devices may access the Internet using a variety of types of connections provided by a variety of different carriers. When responding to a request from a mobile-client system 130 to access particular content objects or webpages of social-networking system 160, it may be advantageous to identify the carrier, connection-type, connection-status, latency-period, other suitable connection-related information, or any combination thereof of the mobile-client system 130. Such connection-related information may be determined using a variety of signals, such as, for example, SIM-card information, user history, autonomous system numbers, IP addresses, device type, other suitable signals, or any combination thereof. Users may switch carriers when they buy new mobile devices. For certain users, they may switch carriers frequently, for example, by switching SIM cards in the same phone. Furthermore, users may have different carriers depending on their currently location, and depending on whether they are roaming. By identifying the various connection-related information, social-networking system 160 may be better able to generate and customize webpages for the particular requesting mobile-client system 130. As an example and not by way of limitation, carrier-detection system 180 may determine that a user with an IPHONE with a 3G data plan from AT&T is accessing social-networking system 160 when it is connected to a Wi-Fi network provided by COMCAST. In this case, social-networking system 160 may customize any content accessed by the user to include advertisements associated with AT&T based on it being the carrier for the IPHONE. Similarly, social-networking system 160 may customize the content accessed by the user to be of high-quality/resolution based on it being over a Wi-Fi connection-type, which is likely able to support such content. Therefore, to address such scenarios, social-networking system 160 may consider connection-related information provided by carrier-detection system 180 when generating and customizing content for users. In particular embodiments, determining connection-related information for a mobile-client system 130 may be subject to privacy settings. The privacy settings may specify, for example, which signals, if any, may be accessed by carrier-detection system 180. Although this disclosure describes determining particular connection-related information in a particular manner, this disclosure contemplates determining any suitable connection-related information in any suitable manner.

In particular embodiments, carrier-detection system 180 may determine a carrier for a mobile-client system 130 based on one or more signals. The carriers may include, for example, AT&T, VERIZON, SPRINT, U.S. CELLULAR, AMERICA MOVIL, T-MOBILE, COMCAST, ORANGE, VODAFONE, MTS, CHINA UNICOM, MVNO, other suitable carriers, or any combination thereof. Carrier-detection system 180 may access and/or receive a variety of signals that may be used to determine (e.g., by inferring particular connection-related information from particular signals) the carrier for a particular mobile-client system 130. These signals may include, for example, SIM-card information, user history, autonomous system numbers, IP addresses, device type, MSISDN, other suitable signals, or any combination thereof. Determining the carrier for a mobile device may be useful in order to help generate or customize appropriate content or advertisements for the webpages requested by the mobile device. Determining the carrier based at least in part on particular signals is described in more detail below. In particular embodiments, the carrier-detection system 180 may determine the carrier for a mobile-client system 130 using one or more models or algorithms to identify the carrier. The score may be, for example, a confidence score, a probability, a quality, a ranking, another suitable type of score, or any combination thereof. Thus, in particular embodiments, carriers having higher calculated scores may be more likely to be the actual carrier used by mobile-computing system 130. As an example and not by way of limitation, the carrier-detection system 180 may calculate a probability score for one or more device carriers based on SIM-card information received from the mobile-computing system 130 and carrier history information associated with the user of the mobile-computing system 130. The following is an example algorithm that carrier-detection system 180 could use to calculate a probability score for a particular carrier of a mobile-client system 130:

$$r_1 = f(S_1, \ldots, S_o, C_1 \ldots C_p)$$

where:
$r_1$ is the probability score for a first carrier,
$S_1, \ldots, S_o$ are SIM-card fields 1 through o, and
$C_1, \ldots, C_p$ are carrier history fields 1 through p.

Particular variables (each correlating to a particular signal described herein) may be more useful for determining particular carriers. Although this disclosure describes calculating a score using particular variables, this disclosure contemplates calculating a score using any suitable variables. In particular embodiments, the model or algorithm implemented by the carrier-detection system 180 may use a machine-learned scoring formula. The scoring algorithm may obtain the scoring formula automatically from a set of training data constructed from data sets including information about, for example, requests for webpages from mobile devices and various users of mobile devices using various carriers, various connection-types, and with various connection-statuses. In particular embodiments, the carrier-detection system 180 may determine the carrier for a mobile-client system 130 by calculating a score for one or more carriers and then identifying the most likely carrier based on these scores. In this way, the carrier-detection system 180 may be able to ensure a relatively high degree of accuracy for correctly identifying carriers of mobile devices. Although this disclosure describes determining particular carriers of mobile-client systems 130 in a particular manner, this disclosure contemplates determining any suitable carriers of mobile-client systems 130 in any suitable manner.

In particular embodiments, carrier-detection system 180 may determine a carrier for mobile-client system 130 based at least on SIM-card information associated with mobile-client system 130. The connection provider of the SIM card may be acquired from the device operating system locally, for example, by having a native application on mobile-client system 130 query for the carrier information associated with the device. This may be a reliable and precise way to determine a carrier, when it is available. The major advantages of this signal are freshness and reliability, even when users switch carriers by swapping SIM cards in their mobile device. In particular embodiments, carrier-detection system 180 may access SIM-card information associated with a mobile-client system 130 in response to receiving a request from mobile-client system 130 for particular content of social-networking system 160. Mobile-client system 130 may be associated with a particular user of the online social network (also referred to as the "first user"). As an example and not by way of limitation, carrier-detection system 180 may send a query to mobile-client system 130 for the SIM-card information. In response, an application on mobile-client system 130 (e.g., a native app associated with social-networking system 160) may access the SIM card of mobile-client system 130 to retrieve the SIM-card information and send the information back to carrier-detection system 180. The SIM-card information may be provided, for example, by an http-header, such as an FBCR field indicating a carrier associated with the SIM card of mobile-client system 130. For example, in the user-agent string sent by a native application on mobile-client system 130 back to carrier-detection system 180, there may be a FBCR field in the application-appended data (mobile app user-agent formats) to indicate the SIM card carrier. Although this disclosure describes accessing particular information about mobile-client system 130 in a particular manner, this disclosure contemplates accessing any suitable information about mobile-client system 130 in any suitable manner. Furthermore, although this disclosure describes determining a carrier based on SIM-card information in a particular manner, this disclosure contemplates determining a carrier based on SIM-card information in any suitable manner.

In particular embodiments, carrier-detection system 180 may determine a carrier for mobile-client system 130 based at least on a carrier history associated with a user. With the assumption that a user normally does not change connection networks very often, carrier-detection system 180 may determine a user's connection information by accessing the recent connection records of a user. Connection provider is usually a very stable property of a user. Many users will have the same carrier for months or longer. Furthermore, where a user does access multiple carriers in a short period, it is often the same carriers over time (e.g., the user may switch between the same two carriers over the course of a day). Patterns in a user's carrier and connection-type may be identified and used to predict the user's current carrier and connection-type in response to a request for content in real-time. Consequently, with the connection records of just a few days of usage, carrier-detection system 180 may infer what the primary carrier and connection-type are for most users in real time with high confidence. As an example and not by way of limitation, if the last time a user requested content the user's determined carrier was ORANGE, then it may be inferred that the user's carrier is likely still the same. As another example and not by way of limitation, if the user typically accesses via Wi-Fi during weekday work hours, and typically access via 4G LTE cellular during evening hours and weekend, subsequent requests during those times may be appropriately inferred. Similarly, a connection-type or other connection-related information may also be determined based on carrier history associated with a user. Although this disclosure describes determining a carrier based on carrier history in a particular manner, this disclosure contemplates determining a carrier based on carrier history in any suitable manner.

In particular embodiments, carrier-detection system 180 may determine a carrier for mobile-client system 130 based at least on an IP address associated with mobile-client system 130. Normally, each ISP has a specific range of IP addresses allocated to it, and the ISP may further subdivide this range into sub-ranges for different purposes. IP addresses of different ISPs should not overlap. Based on this, carrier-detection system 180 may determine the connection provider from the original request IP address, and may even determine the specific connection-type from the IP address. In particular embodiments, carrier-detection system 180 may determine a carrier based on the IP address associated with mobile-client system 130 by determining the range of IP address comprising the IP address associated with the mobile-client system. Each carrier may be associated with a range of IP addresses. As an example and not by way of limitation, carrier-detection system 180 may maintain a map of IP addresses to carriers, allowing it to quickly determine carriers based on the IP address associated with a request. If carrier-detection system 180 receives a request from a first IP address that maps to VODAFONE, the system may infer that the carrier of mobile-client system 130 is VODAFONE. However, sometimes carriers change their network configuration without updating the IP address list on a mobile operator portal, resulting in incorrect results based on carrier determination by IP address. To handle these scenarios, carrier-detection system 180 may first check the IP address of the first hop indicated in an http-header received with the request (e.g., the X-Forwarded-For header), and fall back to check the immediate request IP address to handle the case of proxied requests. Both IPv4 and IPv6 addresses may be checked. Similarly, a connection-type or other connection-related information may also be determined based on an IP address associated with mobile-client system 130. Although this disclosure describes determining a carrier based on IP address in a particular manner, this disclosure contemplates determining a carrier based on IP address in any suitable manner.

In particular embodiments, carrier-detection system 180 may determine a carrier for mobile-client system 130 based at least on an autonomous systems number (ASN) associated with mobile-client system 130. The Internet is formed by many interconnected individual regional networks, which are called autonomous systems. Each autonomous system is identified by a predefined autonomous system number allocated from ICANN. This ASN is used to build the routing table in a BGP routing protocol. In most cases, each single ASN is owned and maintained by a single ISP. Thus, carrier-detection system 180 may infer the carrier for mobile-client system 130 based on the ASN associated with the request by accessing a database identifying the carrier that owns that ASN. Although this disclosure describes determining a carrier based on ASN in a particular manner, this disclosure contemplates determining a carrier based on ASN in any suitable manner.

In particular embodiments, carrier-detection system 180 may determine a carrier for mobile-client system 130 based at least on the attributes of mobile-client system 130. The attributes of mobile-client system 130 may be determined as described previously. As an example and not by way of limitation, particular smartphone makes/models may only be sold/supported/carried by particular carriers. If carrier-detection system 180 can determine the make/model of mobile-client system 130, it may access a database of devices supported by different carriers to identify the likely carrier for mobile-client system 130, or at least rule out carriers that don't support/sell that type of device. Although this disclosure describes determining a carrier based on attributes of a mobile device in a particular manner, this disclosure contemplates determining a carrier based on attributes of a mobile device in any suitable manner.

In particular embodiments, carrier-detection system 180 may determine a carrier for mobile-client system 130 based at least on a mobile network code (MNC) or mobile country code (MCC) associated with mobile-client system 130. As an example and not by way of limitation, the combination of MNC and MCC may be used to uniquely identify a mobile phone operator/carrier within various types of mobile network and some satellite mobile network, such as, for example, the GSM/LTE, CDMA, iDEN, TETRA and UMTS networks. A native mobile app on mobile-client system 130 may send back the MNC/MCC tuple to carrier-detection system 180, which may access a database of the MNC and MCC information of carriers to identify which carrier the request comes from. Although this disclosure describes determining a carrier based on MNC and MCC in a particular manner, this disclosure contemplates determining a carrier based on MNC or MCC in any suitable manner.

In particular embodiments, carrier-detection system 180 may determine a carrier for mobile-client system 130 based at least on user information associated with the user of mobile-client system 130. User information may include, for example, social-networking information, any information provided by a user of the online social network, or information stored in association with the user's account. As an example and not by way of limitation, the user information may be a user profile of the online social network corresponding to the first user. The first user may specify in his user profile that he "likes" AT&T, which carrier-detection system 180 may then use to infer the carrier for the user's mobile device is AT&T. Alternatively, the user may explicitly list his carrier in his user profile. As another example and not by way of limitation, the user information may be user profile information corresponding to friends of the first user (i.e., users corresponding to user nodes 202 connected by a friend-type edge 206 to the user node 202 corresponding to the first user). These users may for example, specify the carriers for their phones, and thus the carrier for the first user's phone may be inferred from the carriers of his friends (or possible the carriers previously determined by carrier-detection system 180 of the user's friends). Although this disclosure describes determining a carrier based on particular user information in a particular manner, this disclosure contemplates determining a carrier based on any suitable user information in any suitable manner.

In particular embodiments, carrier-detection system 180 may determine the connection-type for mobile-client system 130. Connection-types for mobile-client systems 130 may include, for example, WiFi, WiMAX, HSPA+, CDMA, 2G, 2.5G/GPRS, 2.75G/EDGE, 3G, 4G, 4G LTE, other suitable types of wireless connections, or any combination thereof. A major challenge of connection-type detection is detecting when a request is from the radio path or from a WiFi path (e.g., Wi-Fi or WiMAX). Many carriers provide both WiFi and cellular data. As an example and not by way of limitation, a user with an IPHONE may be on the street connecting to social-networking system 160 via AT&T's 4G LTE network, and then move into a café and join a Wi-Fi network provided by AT&T. Connection-type may be inferred by looking at the IP address of the requesting mobile-client system 130, and comparing that to historical connection-type from that IP address, which may be been previously determined (e.g., because the user accessed social-networking system 160 using a native application that could determine connection-type information for mobile-client system 130). As an example and not by way of limitation, if it has previously been determined that a connection-type from a particular IP address is WiMAX, carrier-detection system 180 may determine that a current request coming from that IP address is also of a WiMAX connection-type. Connection-type may also be inferred by looking at the WiFi capabilities of mobile-client system 130. If, for example, a device does not have WiFi capabilities, or if its WiFi antenna is disabled, this can be used to infer that the device is not on a WiFi network (and thus, for example, likely to be on a radio network). Connection-type may also be inferred by looking at the connection provider characteristics. As an example and not by way of limitation, if a connection provider only runs cell/radio service, it can be inferred that the request likely is not from a WiFi connection-type. Similarly, if a connection provider does not run cell/radio service at all, the connection-type of the request may likely to be WiFi. Determining connection-type may be advantageous, for example, for allowing better accuracy when counting users accessing social-networking system 160 using particular carriers, for customizing the user's experience, or for advertising. In particular embodiments, social-networking system 160 may then customize content accessed by mobile-client system 130 at least in part on the determined connection-type. As an example and not by way of limitation, social-networking system 160 may customize the content to be of high-quality/resolution for a Wi-Fi connection-type, which is likely able to support such content, while lower-quality/resolution content may be used for cellular connections, like 2G, 3G, or LTE connection-types. As another example and not by way of limitation, social-networking system 160 may customize the content to include particular advertisements based on, for example, the carrier providing the connection-type. Although this disclosure describes determining particular connection types in a particular manner, this disclosure contemplates determining any suitable connection types in any suitable manner.

In particular embodiments, carrier-detection system 180 may determine a carrier or connection-type for mobile-client system 130 based at least on an http-header received with the request from mobile-client system 130. As an example and not by way of limitation, a native application of the online social network on mobile-client system 130 may send carrier-detection system 180 the connection information via an http-header (e.g., the X-FB-Connection-Type header), such as, for example, the header "mobile.lte", where this header specifies the connection-type for mobile-client system 130 as being LTE. Although this disclosure describes determining connection information based on http-headers in a particular manner, this disclosure contemplates determining connection information based on http-headers in any suitable manner.

In particular embodiments, carrier-detection system 180 may determine the connection-status for mobile-client system 130. Connection-status may include, for example, WiFi (i.e., being connected via WiFi or WiMAX), SIM (i.e., being with the carrier associated with the SIM card of the mobile device), roaming (i.e., being with a carrier not associated with the SIM card of the mobile device), or other suitable connection statuses. As an example and not by way of limitation, carrier-detection system 180 may compute statistics of the different connection-type and carrier information associated to particular mobile-client devices 130, and then with such statistics carrier-detection system 180 may determine whether a specific connection is the SIM card connection or WiFi or roaming. Determining connection-status may be advantageous, for example, for allowing content to be better served to a user. In particular embodiments, social-networking system 160 may then customize content accessed by mobile-client system 130 at least in part on the determined connection-status. As an example and not by way of limitation, social-networking system 160 may customize the content to be of high-quality/resolution for a SIM connection-status, which may allow for data transfer without additional charges, while lower-quality/resolution content may be used for a roaming connection-status, where additional charges may be incurred for content sent to mobile-client system 130. Although this disclosure describes determining particular connection statuses in a particular manner, this disclosure contemplates determining any suitable connection statuses in any suitable manner.

In particular embodiments, carrier-detection system 180 may determine the latency-period or bandwidth for mobile-client system 130. The latency-period for a connection (also called network latency) refers to the delay time between requests and responses of the mobile-client system 130. It may be difficult in certain cases to accurately detect the current connection latency in real time, since such low-level information may be lost in the application logic layer (PHP). The latency-period may be inferred from the IP address, ASN, or connection-type of the request. Carrier-detection system 180 may collect network statistics about in-bound and/or out-bound traffic, including network latency and bandwidth. This latency and bandwidth data may then be correlated with the corresponding IP addresses, ASNs, and connection-types to construct a detection model for real-time determination of the latency-period (bandwidth may be determined similarly). Determining the latency-period or bandwidth may be advantageous, for example, for allowing content to be better served to a user. In particular embodiments, social-networking system 160 may customize content accessed by mobile-client system 130 at least in part on the determined latency-period. As an example and not by way of limitation, social-networking system 160 may customize content to include more interactive content/ads to a mobile-client system 130 having a low latency-period, while less interactive content/ads may be used for a long latency-period connection. In particular embodiments, social-networking system 160 may customize content accessed by mobile-client system 130 at least in part on the determined bandwidth. As an example and not by way of limitation, social-networking system 160 may customize content to include more video/photo contents/ads in a high network bandwidth context, while less multimedia content/ads (and/or possibly more text) may be used for low network bandwidth context. Although this disclosure describes determining latency-period and bandwidth in a particular manner, this disclosure contemplates determining latency-period or bandwidth in any suitable manner.

In particular embodiments, the carrier-detection system 180 may send a webpage or other content to the mobile-client system 130 in response to the request for from the mobile-client system 130. The content may be customized based on the determined connection-related information for mobile-client system 130. In particular embodiments, carrier-detection system 180 may customize the requested content based on the determined carrier such that the content includes content associated with the carrier in the webpage. As an example and not by way of limitation, if the user's carrier is determined to be COMCAST, a webpage sent in response to the user's request may include content that is available only to COMCAST customers, such as, for example, streaming multimedia content from COMCAST. In particular embodiments, carrier-detection system 180 may customize the requested content based on the determined carrier such that the content includes advertisements associated with the carrier in the content. The advertisements may be included in as part of the content, or separately. As an example and not by way of limitation, if the user's determined carrier is AT&T, a webpage sent back to the user's mobile-client device 130 may be an advertisement for AT&T services, or an advertisement otherwise associated with AT&T. The requested content may be customized in a variety of ways. As an example and not by way of limitation, a server-side script may specifically format a webpage for the mobile-client system 130. As another example and not by way of limitation, a server-side script may forward the request to another server-side script associated with the mobile version of the webpage. The sent content may then be displayed to the user on the mobile-client system 130. Although this disclosure describes customizing and sending particular webpages and content in a particular manner, this disclosure contemplates customizing or sending any suitable webpages or other content in any suitable manner.

Figure 3:
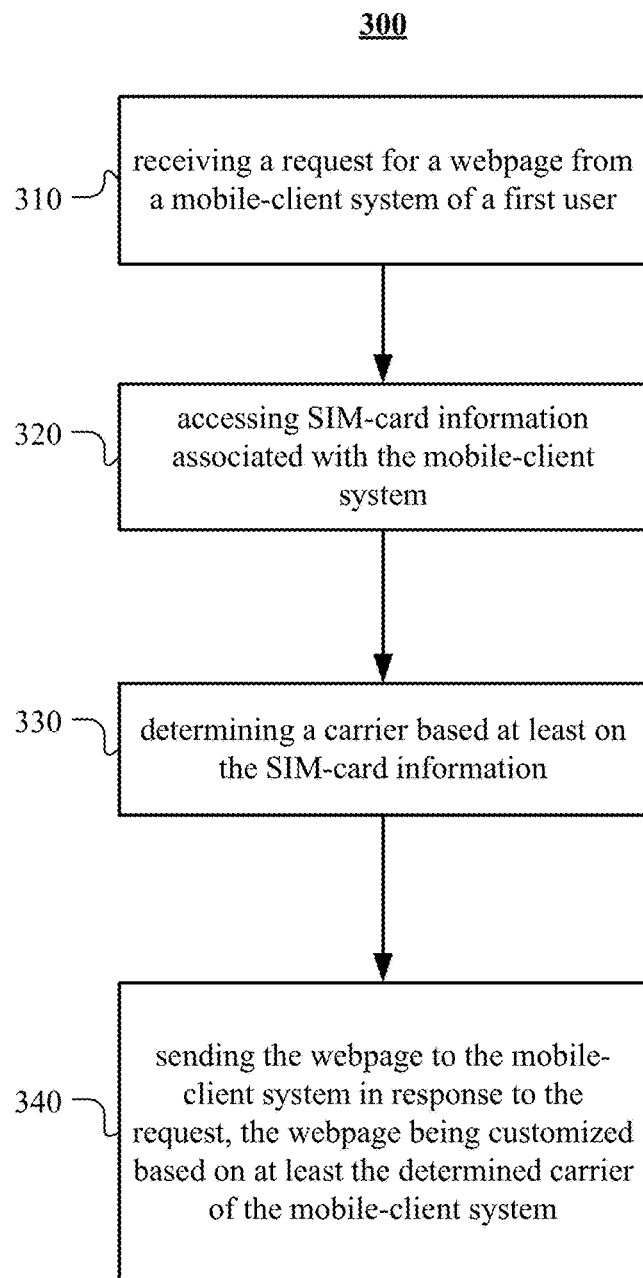
FIG. 3 illustrates an example method for determining the carrier of a mobile device.

FIG. 3 illustrates an example method 300 for determining the carrier of a mobile device. The method may begin at step 310, where a carrier-detection system 180 may receive a request for a webpage from a mobile-client system 130 of a first user. The carrier-detection system 180 may be physically or logically co-located with another system (such as, for example, a social-networking system 160, a 3rd-party application server, a web server, an enterprise server, or another suitable system) in whole or in part. At step 320, the carrier-detection system 180 may access SIM-card information associated with the mobile-client system 130. This SIM-card information may include, for example, an FBCR field indicating a carrier associated with the SIM card of the mobile-client system 130. At step 330, the carrier-detection system 180 may determine a carrier based at least on the SIM-card information. At step 340, the carrier-detection system 180 may send the webpage to the mobile-client system 130 in response to the request. The sent webpage may be customized based on the determined carrier of the mobile-client system 130. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
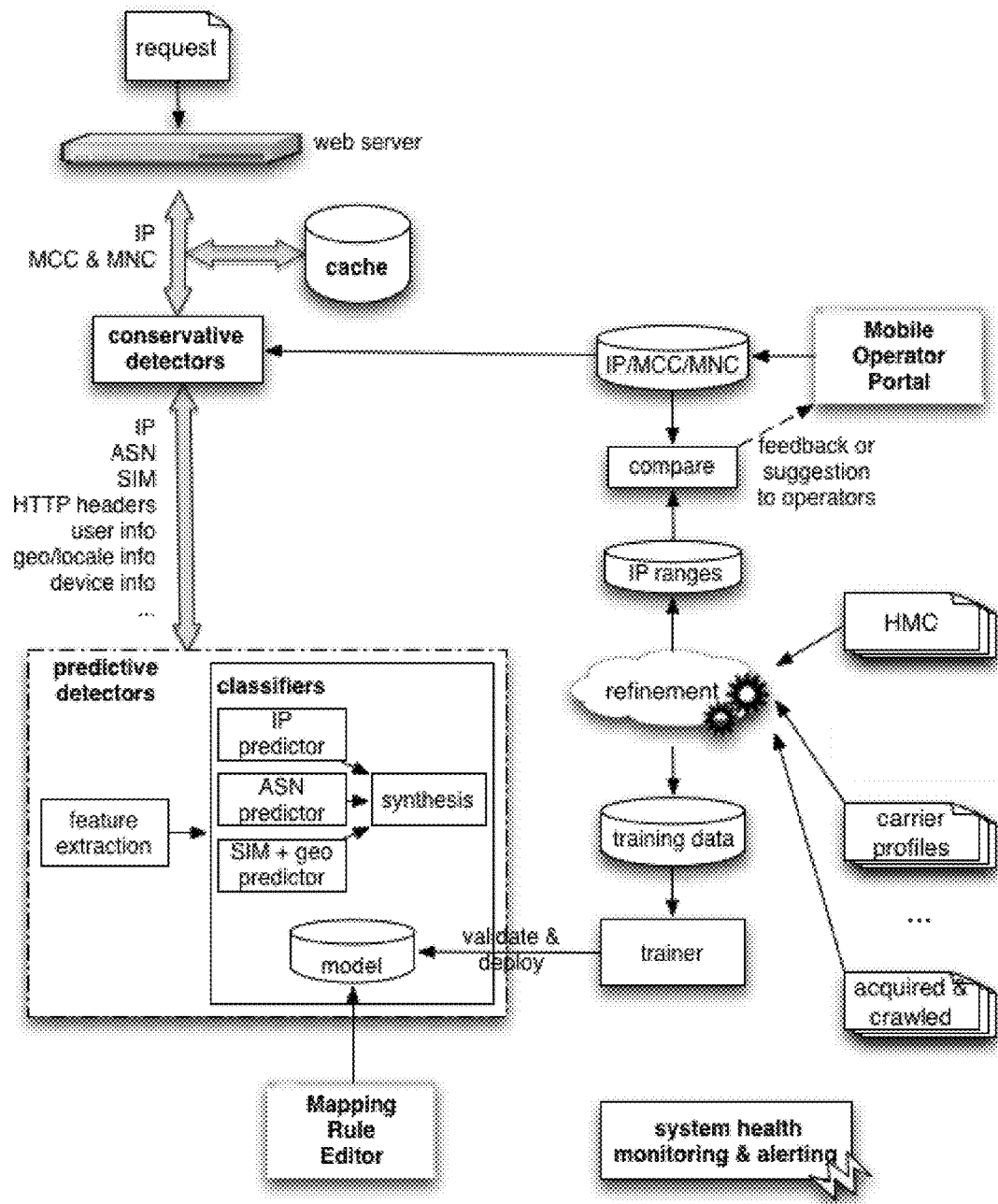
FIG. 4 illustrates an example carrier-detection system environment.

FIG. 4 illustrates an example carrier-detection system environment. Carrier-detection system 180, in conjunction with one or more components of the carrier-detection system environment, may use one or more carrier-detection algorithms to determine connection-related information for mobile-client system 130. The carrier-detection algorithms may include a set of scalable and highly-responsive algorithms taking multiple inputs including, for example, SIM-card information, user history, autonomous system numbers, IP addresses, device type, other suitable signals, or any combination thereof. Carrier-detection system 180 may include different modes to support different use cases. As an example and not by way of limitation, carrier-detection system 180 may include a conservative detector implementing a conservative detection mode based on information submitted by mobile carriers to carrier-detection system 180, including IP address range, MNC and MCC pairs. As another example and not by way of limitation, carrier-detection system 180 may include a predictive detector implementing a prediction mode synthesizing the aforementioned signals and models trained offline to do a best guess on the connection-related information of the current request from mobile-client system 130. Carrier-detection system environment may include one or more of a web server, a cache, a conservative detector, a predictive detector, a mapping rule editor, a data store of IP/MCC/MNC data, a mobile operator portal, training data, a trainer, a system health monitoring and alerting system, other suitable components, or any combination thereof. The web server may receive requests from a mobile-client system 130 to access particular content objects or webpage of social-networking system 160. The data store of IP/MCC/MNC data may include IP range, MCC, and/or MNC data of various carriers, which may be provided by the carriers using a mobile operator portal. The mobile operator portal may use a public user interface to allow carriers (or other network operators) to submit their information, such as, for example, IP address ranges, MNC and MCC pairs, other suitable information associated with the carrier, or any combination thereof. As part of the carrier detection process, if carrier-detection system 180 determines that particular IP addresses are associated with particular carriers, and this contradicts information previously provided by the carrier, then as part of a refinement process carrier-detection system 180 may provide feedback or suggestions to the carrier to update its IP address range information. In this way, a feedback loop may be created, in which carrier-detection system 180 may compare the current carrier detection model with the carrier information submitted via the mobile operator portal, and feedback the difference to the carrier to help them improve the information submitted in the mobile operator portal (thus, for example, improving the quality of the conservative detection mode). The trainer may generate carrier prediction models for carrier-detection system 180 based on historical training data. The system health monitoring and alerting system may provide monitoring, alerting, response, and debugging facilities in order to provide operational quality assurance for the carrier-detection system environment. The mapping rule editor may establish an extract/transform/load (ETL) procedure for the carrier-detection system environment. In particular embodiments, determining connection-related information for a mobile-client system 130 may be subject to privacy settings. The privacy settings may specify, for example, which signals, if any, may be accessed by carrier-detection system 180. Although FIG. 4 illustrates a particular arrangement of the component of the carrier-detection system environment, this disclosure contemplates any suitable arrangement of the carrier-detection system environment. Moreover, although FIG. 4 illustrates a particular number of each component of carrier-detection system environment, this disclosure contemplates any suitable number of the components of carrier-detection system environment.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Figure 5:
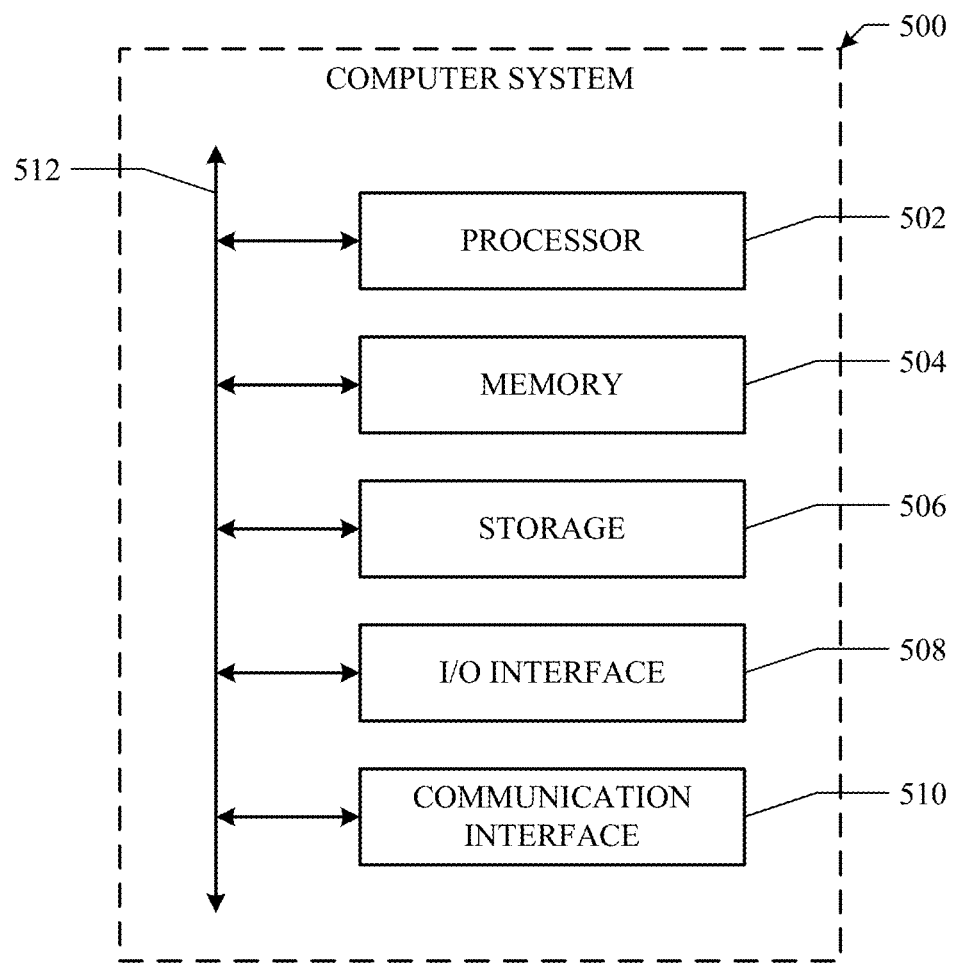
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a mobile-client system:
   sending, to a computing server, a request for a multimedia object;
   receiving, from the computing server, in response to the request, a query for SIM-card information associated with the mobile-client system;
   in response to the query, executing an application on the mobile-client system to access a SIM card of the mobile-client system and retrieve SIM-card information from the SIM card;
   sending, to the computing server, the retrieved SIM-card information responsive to the query; and receiving, from the computing server, a multimedia object responsive to the request, wherein the multimedia object is customized based on the retrieved SIM-card information.

2. The method of claim 1, wherein customizing the multimedia object based on the retrieved SIM-card information comprises customizing a content of the multimedia object based on at least a determined carrier of the mobile-client system.

3. The method of claim 2, wherein the carrier is determined based on a carrier history associated with a user of the mobile-client system.

4. The method of claim 2, wherein the carrier is determined based on an autonomous systems number (ASN) associated with the mobile-client system.

5. The method of claim 2, wherein the carrier is determined based on an IP address associated with the mobile-client system.

6. The method of claim 5, wherein each of a plurality of carriers is associated with a range of IP addresses, and wherein the carrier is determined based on an IP address associated with the mobile-client system by determining the range of IP addresses comprising the IP address associated with the mobile-client system.

7. The method of claim 2, wherein customizing the multimedia object based on at least the determined carrier comprises including content associated with the carrier in the multimedia object.

8. The method of claim 2, wherein customizing the multimedia object based on at least the determined carrier comprises including advertisements associated with the carrier in the multimedia object.

9. The method of claim 1, wherein the SIM-card information comprises an http-header indicating a carrier associated with the SIM card of the mobile-client system.

10. The method of claim 9, wherein the http-header information comprises at least a user-agent string describing one or more attributes of a browser client of the mobile-client system.

11. The method of claim 10, wherein the multimedia object is further customized based on at least the described attributes of the browser client of the mobile-client system.

12. The method of claim 10, wherein the one or more attributes of the browser client of the mobile-client system comprise one or more of programming language support, style-sheet language support, screen size, screen pixel density, keyboard type, location-services support, wireless communication support, image support, or video support.

13. The method of claim 10, wherein the carrier is determined further based on the determined attributes of the browser client of the mobile-client system.

14. The method of claim 1, wherein the multimedia object is further customized based on a determined connection type between the mobile-client system and the computing server.

15. The method of claim 1, wherein the multimedia object is further customized based on a determined connection-status between the mobile-client system.

16. The method of claim 1, wherein the multimedia object is further customized based on a determined latency-period between the mobile-client system and the computing server.

17. The method of claim 1, further comprising:
accessing, from a local cache of the mobile-client system, a portion of a social graph of an online social network, the social graph comprising a plurality of nodes and a plurality of edges connecting the nodes, each of the edges between two of the nodes representing a single degree of separation between them, the nodes comprising:
a first node corresponding to a first user of the mobile-client system; and
a plurality of second nodes corresponding to a plurality of objects associated with the computing system, respectively;
wherein customizing the multimedia object is further based on one or more edges connected to the first node.

18. The method of claim 1, wherein the carrier is determined based on user information associated with a first user of the mobile-client system.

19. One or more computer-readable non-transitory storage media embodying software that is operable when executed by a mobile-client system to:
send, to a computing server, a request for a multimedia object;
receive, from the computing server, in response to the request, a query for SIM-card information associated with the mobile-client system;
in response to the query, execute an application on the mobile-client system to access a SIM card of the mobile-client system and retrieve SIM-card information from the SIM card;
send, to the computing server, the retrieved SIM-card information responsive to the query; and
receive, from the computing server, a multimedia object responsive to the request, wherein the multimedia object is customized based on the retrieved SIM-card information.

20. A mobile-client system comprising: one or more processors; and a memory coupled to the processors comprising instructions executable by the processors, the processors operable when executing the instructions to:
send, to a computing server, a request for a multimedia object;
receive, from the computing server, in response to the request, a query for SIM-card information associated with the mobile-client system;
in response to the query, execute an application on the mobile-client system to access a SIM card of the mobile-client system and retrieve SIM-card information from the SIM card;
send, to the computing server, the retrieved SIM-card information responsive to the query; and
receive, from the computing server, a multimedia object responsive to the request, wherein the multimedia object is customized based on the retrieved SIM-card information.

21. The mobile-client system of claim 20, wherein customizing the multimedia object based on the retrieved SIM-card information comprises customizing a content of the multimedia object based on at least a determined carrier of the mobile-client system.

22. The mobile-client system of claim 21, wherein the carrier is determined based on a carrier history associated with a user of the mobile-client system.

23. The mobile-client system of claim 21, wherein the carrier is determined based on an autonomous systems number (ASN) associated with the mobile-client system.

24. The mobile-client system of claim 21, wherein the carrier is determined based on an IP address associated with the mobile-client system.

25. The mobile-client system of claim 24, wherein each of a plurality of carriers is associated with a range of IP addresses, and wherein the carrier is determined based on an IP address associated with the mobile-client system by determining the range of IP addresses comprising the IP address associated with the mobile-client system.

26. The mobile-client system of claim 21, wherein customizing the multimedia object based on at least the determined carrier comprises including content associated with the carrier in the multimedia object.

27. The mobile-client system of claim 21, wherein customizing the multimedia object based on at least the determined carrier comprises including advertisements associated with the carrier in the multimedia object.

28. The mobile-client system of claim 20, wherein the SIM-card information comprises an http-header indicating a carrier associated with the SIM card of the mobile-client system.

29. The mobile-client system of claim 28, wherein the http-header information comprises at least a user-agent string describing one or more attributes of a browser client of the mobile-client system.

30. The mobile-client system of claim 29, wherein the multimedia object is further customized based on at least the described attributes of the browser client of the mobile-client system.

31. The mobile-client system of claim 29, wherein the one or more attributes of the browser client of the mobile-client system comprise one or more of programming language support, style-sheet language support, screen size, screen pixel density, keyboard type, location-services support, wireless communication support, image support, or video support.

32. The mobile-client system of claim 29, wherein the carrier is determined further based on the determined attributes of the browser client of the mobile-client system.

33. The mobile-client system of claim 20, wherein the multimedia object is further customized based on a determined connection type between the mobile-client system and the computing server.

34. The mobile-client system of claim 20, wherein the multimedia object is further customized based on a determined connection-status between the mobile-client system.

35. The mobile-client system of claim 20, wherein the multimedia object is further customized based on a determined latency-period between the mobile-client system and the computing server.

36. The mobile-client system of claim 20, wherein the processors are further operable when executing the instructions to:
  access, from a local cache of the mobile-client system, a portion of a social graph of an online social network, the social graph comprising a plurality of nodes and a plurality of edges connecting the nodes, each of the edges between two of the nodes representing a single degree of separation between them, the nodes comprising:
    a first node corresponding to a first user of the mobile-client system; and
    a plurality of second nodes corresponding to a plurality of objects associated with the computing system, respectively;
    wherein customizing the multimedia object is further based on one or more edges connected to the first node.

37. The mobile-client system of claim 20, wherein the carrier is determined based on user information associated with a first user of the mobile-client system.

* * * * *